(12) United States Patent
Fan et al.

(10) Patent No.: US 10,121,395 B2
(45) Date of Patent: Nov. 6, 2018

(54) HOUSING FOR FLEXIBLE DEVICE

(71) Applicant: Lenovo (Beijing) Limited, Beijing (CN)

(72) Inventors: Xiaoli Fan, Beijing (CN); Lei Ma, Beijing (CN); Changlong Zuo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 8 days.

(21) Appl. No.: 15/391,816

(22) Filed: Dec. 27, 2016

(65) Prior Publication Data

US 2017/0188471 A1 Jun. 29, 2017

(30) Foreign Application Priority Data

Dec. 28, 2015 (CN) .......................... 2015 1 1001539

(51) Int. Cl.
*G09F 9/30* (2006.01)
*G06F 1/16* (2006.01)

(52) U.S. Cl.
CPC ............ *G09F 9/301* (2013.01); *G06F 1/1601* (2013.01); *G06F 1/1626* (2013.01); *G06F 1/1652* (2013.01); *G06F 1/1656* (2013.01)

(58) Field of Classification Search
CPC ...................................................... G09F 9/301
See application file for complete search history.

(56) References Cited

U.S. PATENT DOCUMENTS

| 2014/0226275 A1* | 8/2014 | Ko ......................... G06F 1/1626 |
| | | 361/679.27 |
| 2016/0014919 A1* | 1/2016 | Huitema ................ G06F 1/1652 |
| | | 313/511 |
| 2017/0287385 A1* | 10/2017 | Lian ...................... G09G 3/2092 |
| 2017/0329369 A1* | 11/2017 | Takayanagi ........... G06F 1/1652 |
| 2018/0011515 A1* | 1/2018 | Yoo ........................ G06F 1/1626 |
| 2018/0014414 A1* | 1/2018 | Kim .................... H01L 51/5237 |

* cited by examiner

*Primary Examiner* — Christopher Mahoney
(74) *Attorney, Agent, or Firm* — Ference & Associates LLC

(57) ABSTRACT

One embodiment provides a deformable housing, including a recess for holding a deformable device; a deformable portion comprising at least two surfaces having a plurality of concave/convex structures; and at least two support parts embedded in the deformable portion. Other aspects are described and claimed.

17 Claims, 10 Drawing Sheets

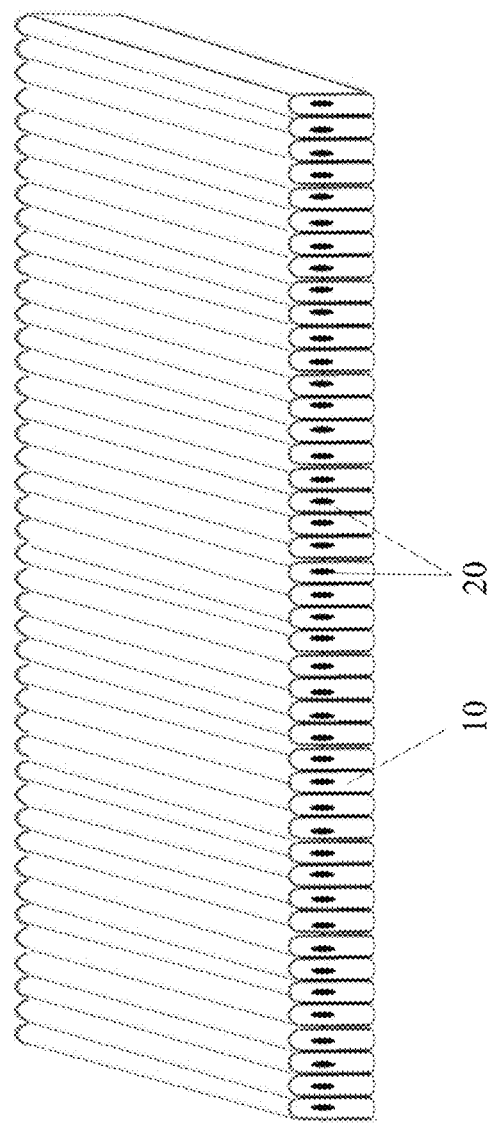

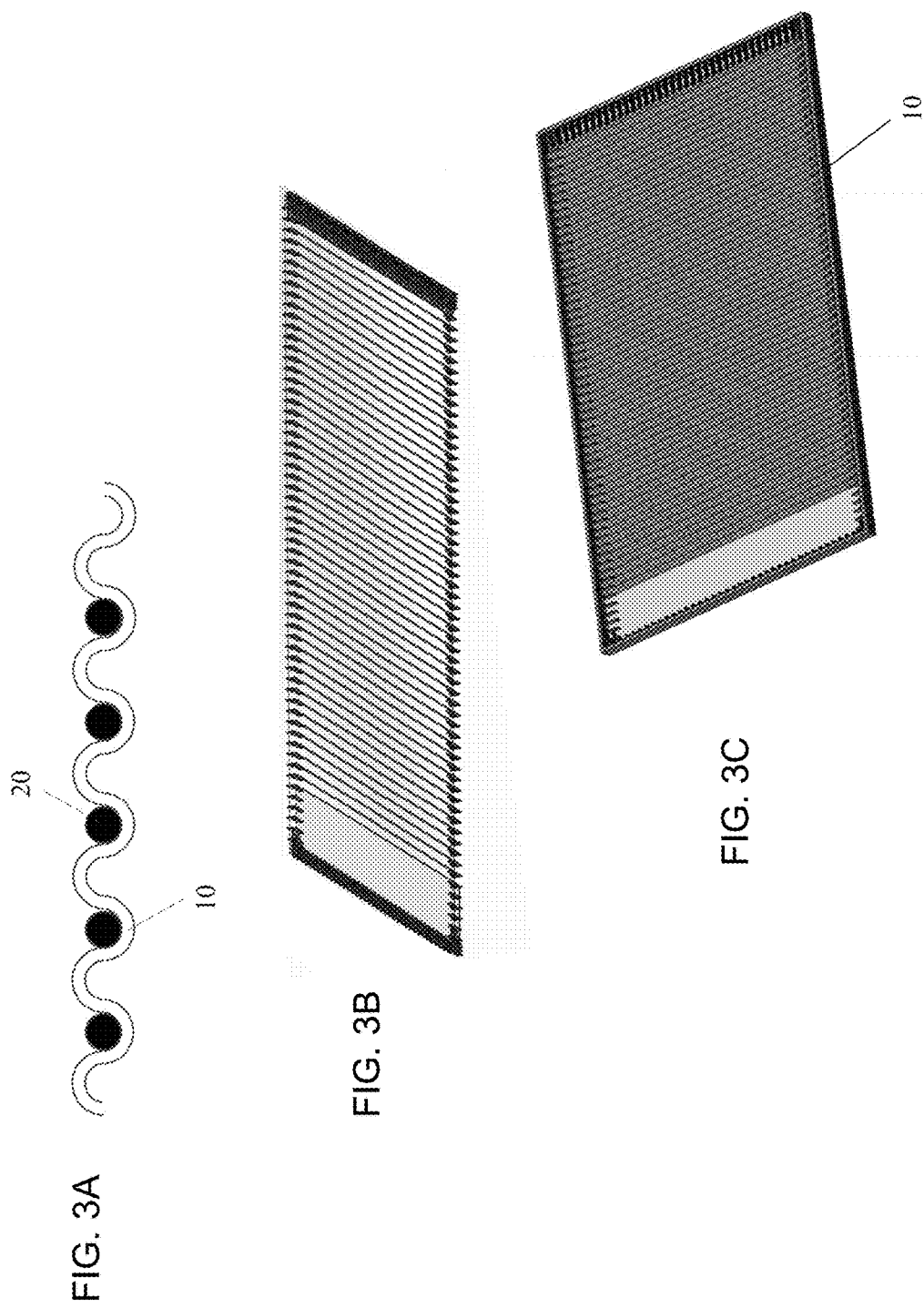

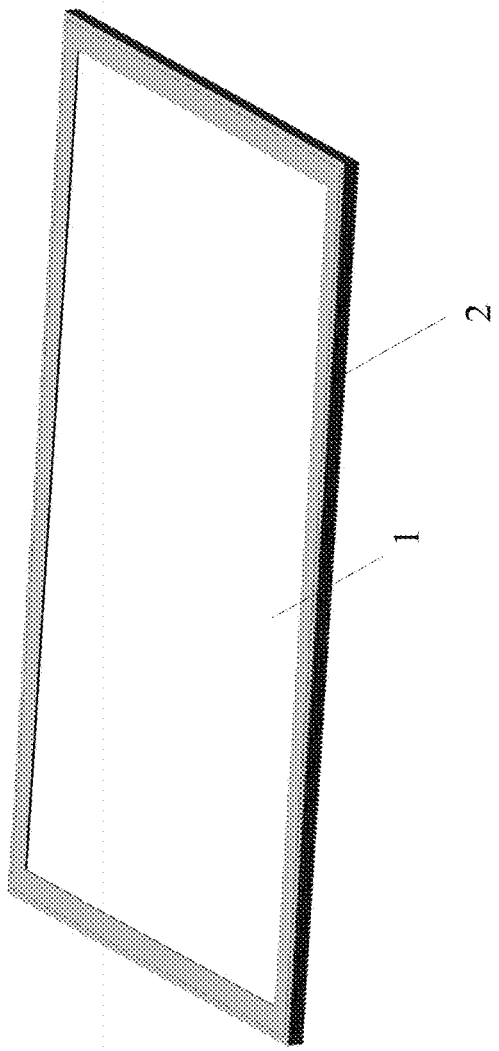
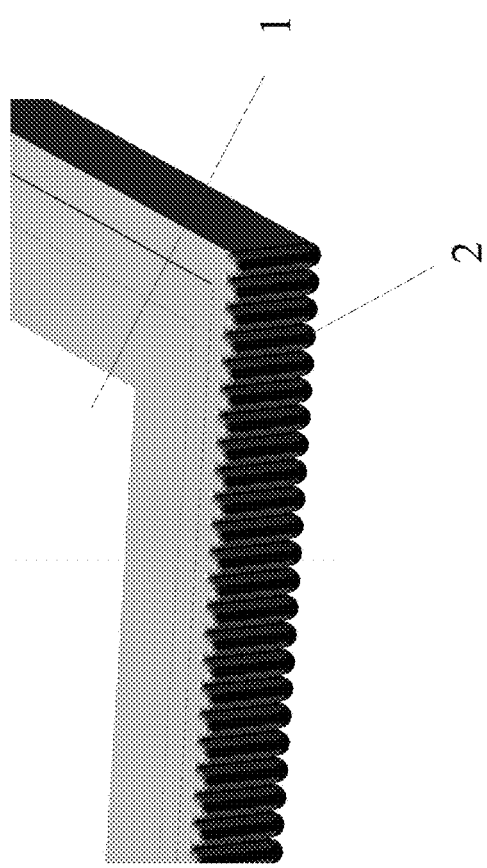
FIG. 5A
FIG. 5B

HOUSING FOR FLEXIBLE DEVICE

CLAIM FOR PRIORITY

This application claims priority to Chinese Application No 201511001539.X filed on Dec. 28, 2015, which is fully incorporated by reference herein.

FIELD

The subject matter described herein relates to the technical field of electronic technology, more specifically, it relates to an elastic apparatus and a deformable device.

BACKGROUND

With the continuous development of scientific technologies, electronic technology has also developed at a rapid rate, and both the performance and appearance of electronic devices have improved greatly. For example, the displays of electronic devices were previously developed from LCD displays to LED displays and have further developed to the current OLED flexible displays. Therefore, flexible display devices have emerged in response to these developments, and because they are flexible and rich in device forms and portability features, they are gradually accumulating more and more interest.

BRIEF SUMMARY

In summary, one aspect provides a deformable housing, comprising: a recess for holding a deformable device; a deformable portion comprising at least two surfaces having a plurality of concave/convex structures; and at least two support parts embedded in the deformable portion.

Another aspects provides a system, comprising: a deformable device having a flexible display; and a deformable housing coupled to the deformable device, wherein the deformable housing comprises: a recess for holding a deformable device; a deformable portion comprising at least two surfaces having a plurality of concave/convex structures; and at least two support parts embedded in the deformable portion.

A further aspect provides a system, comprising: a deformable device having a flexible display; a deformable housing coupled to the deformable device, wherein the deformable housing comprises: a recess for holding a deformable device; a deformable portion comprising a plurality of concave/convex structures; and at least two support parts embedded in the deformable portion; and at least one flexible rotating shaft disposed within the deformable housing, wherein the at least one flexible rotating shaft id secured to the deformable housing by the at least two support parts.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 is a structural schematic diagram of an elastic apparatus according to an embodiment;

FIG. 3A is a structural schematic diagram showing connection of a concave/convex structure and a support part according to an embodiment;

FIG. 3B is a structural schematic diagram showing a support part which may form a rigid enhanced rib plate according to an embodiment;

FIG. 3C is a structural schematic diagram showing an elastic case formed by a rigid enhanced rib plate and a deformable part according to an embodiment;

FIG. 5A is a structural schematic diagram showing a deformable device according to an embodiment;

FIG. 5B is an enlarged view showing a corner of a deformable device according to an embodiment;

DETAILED DESCRIPTION

Figure 2A:
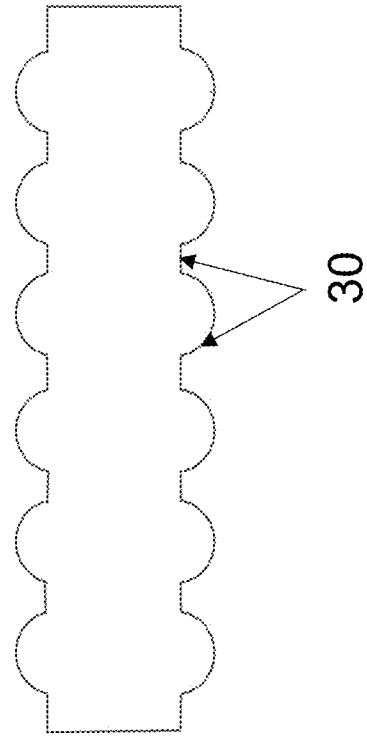
FIG. 2A is a structural schematic diagram showing a concave/convex structure in a non-stretch state according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In order to meet the deformation requirements of flexible display devices, a higher stretch rate is necessary for deformable device cases. However, at present the deformation effects of most cases are relatively poor, to the point that they cannot meet the requirements of deformable device.

In the present application, a deformable housing and a deformable device are provided to solve the technical issues of poor deformation of a case of the deformable device in the prior art.

In an embodiment, the deformable housing (or elastic case) includes a deformable part and at least two support parts, which are embedded in the deformable part for supporting the elastic apparatus. At least two surfaces of the deformable part appear as regular concave/convex structures, which degrees of concavity/convexity can change subject to the force applied to the deformable part, so that as a relative location between the at least two support parts changes, a deformation generated by the concave/convex structures may actuate the deformable part to generate a corresponding deformation if the deformable device is deformed, such that the elastic apparatus provides a better stretch effect. Since the at least two surfaces of the deformable part appear as concave/convex structures, and the degrees of concavity/convexity of the concave/convex structures will change with the acting force applied to the deformable part, elasticity required by the elastic apparatus is provided.

In addition, the shape of the deformable part can be maintained more stably to avoid creep due to excessive deformation of the deformable part under support of the at least two support parts because the at least two support parts are embedded in the deformable part.

In an embodiment, the deformable device may be, but is not limited to, a device with a flexible display, such as a mobile phone, a PAD (tablet computer), and the like.

In an embodiment, the elastic apparatus may constitute at least a portion of the elastic case of the deformable device. When the deformable device is deformed, an elastic force provided by the elastic apparatus can result in a deformation in correspondence with the deformable device for the elastic case. In an embodiment, the elastic apparatus is used as an example of the elastic case of the deformable device.

In addition, the term "and/or" herein shows only an association relation describing associated objects, and may indicate existence of three relations. For example, "A and/or B" may indicate three situations, including "A" exists alone, both "A" and "B" exist, "B" exists alone. In addition, the character "/" herein generally indicates that the precedent and the following associated objects form an "or" relation.

Referring to FIG. 1, an elastic apparatus is disclosed. The elastic apparatus includes a deformable part 10 and at least two support parts 20, wherein the at least two support parts 20 are embedded in the deformable part 10.

In an embodiment, the deformable part 10 in the elastic apparatus may be made from elastic materials, which may include, for example, high elastic polymeric materials, such as TPU (Thermoplastic Polyurethane), TPSiV (Thermo Plastic Silicone Vulcanizate) and the like. The support part 20 may be made from rigid materials, which include, for example, high rigid polymeric materials, such as nanoparticle enhanced polycarbonate materials or nylon materials and the like.

It can be seen from FIG. 1 that, in an embodiment, each support part 20 among the at least two support parts 20 may be in a columnar form, while the cross section of the support part 20 may have a rectangular, triangular or circular shape. The deformable part 10 includes at least two surfaces, which may appear as regular concave/convex structures 30, that is, the wavy fold formed on a surface of the deformable part 10 as shown in the figure. Degrees of concavity/convexity of the concave/convex structures 30 may change subject to the force applied to the deformable part 10.

In an embodiment, the support parts 20 embedded in the deformable part 10 may have a certain spacing therebetween, while the support parts 20 may be surrounded by the deformable part 10 with elasticity to be bound closely together without an additional binder. In an embodiment, at least two support parts 20 are located on a first side of the deformable part 10. The first side may be one side of an inner surface of the elastic apparatus, wherein the inner surface may be a surface close to internal parts of the deformable device when the elastic case is made of the elastic apparatus.

In an embodiment, when the deformable device is deformed, for example, if a user, by way of their hands, applies an external force (that is, an external acting force) such that the deformable device is bent, a relative location between the support parts 20 will change (that is, a relative distance between the support parts 20 tends to be increased as a whole), while the degrees of concavity/convexity of the concave/convex structures 30 in the deformable part 10 will change in correspondence.

Figure 2B:
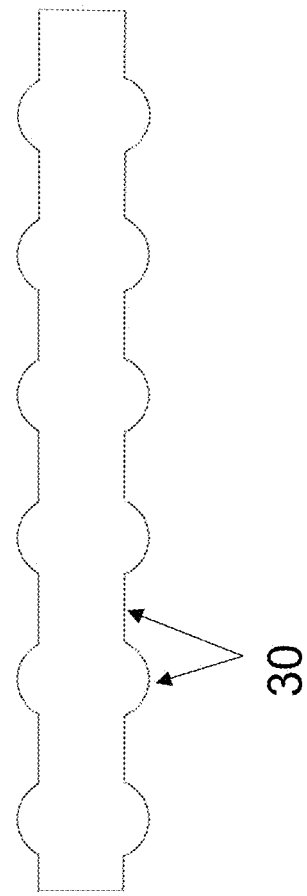
FIG. 2B is a structural schematic diagram showing a concave/convex structure in a stretch state according to an embodiment.

Generally speaking, when the elastic apparatus is elongated, the concave/convex structure 30 in the deformable part 10 may be reduced from a first degree of concavity/convexity to a second degree of concavity/convexity. The first degree of concavity/convexity may be a form of the concave/convex structure 30 of the deformable part 10 without applied external force. As shown in FIG. 2A, a form of the concave/convex structure 30 of the deformable part 10 without applied external force is shown. In this case, the concave/convex structure 30 may be regarded as having the first degree of concavity/convexity, while the elastic apparatus is in a non-stretch state. At the same time, if an external force is applied to the deformable part 10, as shown in FIG. 2A, to stretch the elastic apparatus, then the degree of concavity/convexity of the concave/convex structure 30 will be reduced, as shown in FIG. 2B. Also, from comparison of FIG. 2A and FIG. 2B, a thickness of the deformable part 10 is reduced in correspondence to the stretching of the elastic apparatus.

In an embodiment, a degree of deformation of the deformable part 10 is less than or equal to a maximum degree of deformation with which the deformable part 10 does not creep when a pulling force (that is, an applied external force) applied to the deformable part 10 is not greater than a default pulling force.

In an embodiment, the degree of deformation may be used to indicate a collapsing length of the deformable part 10, that is, a length of compression or stretch. In an embodiment, the degree of deformation may be expressed in percentage, and may be referred to as "stretch rate", that is, the ratio of the length after the elastic material is stretched with respect to the original length. For example, the stretch rate of the elastic case in correspondence to bending of the deformable device may reach 200% or even more, such as 400% and the like.

In an embodiment, the concave/convex structures 30 of the deformable part 10 may include, but are not only limited to the following two structures.

For the first structure, at least two surfaces of the concave/convex structure 30 are of a sinusoidal-like shape, that is, the deformable part 10 appears as a regular wavy thin wall. As such, at least two support parts 20 may be embedded in a groove (that is, a location or opening where a trough is positioned) formed by a concave/convex structure 30 on a first surface (a surface in correspondence with the inner surface of the elastic apparatus) among the at least two surfaces. Referring to FIG. 3A, a schematic diagram of a cross section showing connection of the concave/convex structure 30 and the support part 20 of the deformable part 10 is shown.

Since the deformable part 10 appears as a wavy thin wall, an elastic stretch and a compression deformation due to bending of the elastic apparatus can be borne.

In an embodiment, as shown in FIG. 3B, the at least two support parts 20 may form a rigid enhanced rib plate, the support parts 20 may have a certain spacing (for example, in parallel with each other) therebetween, which may be in correspondence with a distance between two adjacent grooves or openings in the concave/convex structure 30, such that the support parts 20 may be embedded in the groove or opening of the deformable part 10 for the rigid enhanced rib plate and the elastic apparatus to be used in conjunction, so that the rigid enhanced rib plate may provide one-way (that is embedding side) rigidity for the elastic apparatus without impact on flexibility in another direction. As shown in FIG. 3C, the elastic case (formed of the elastic apparatus) formed of the rigid enhanced rib plate and the deformable part 10 is shown.

Figure 3E:
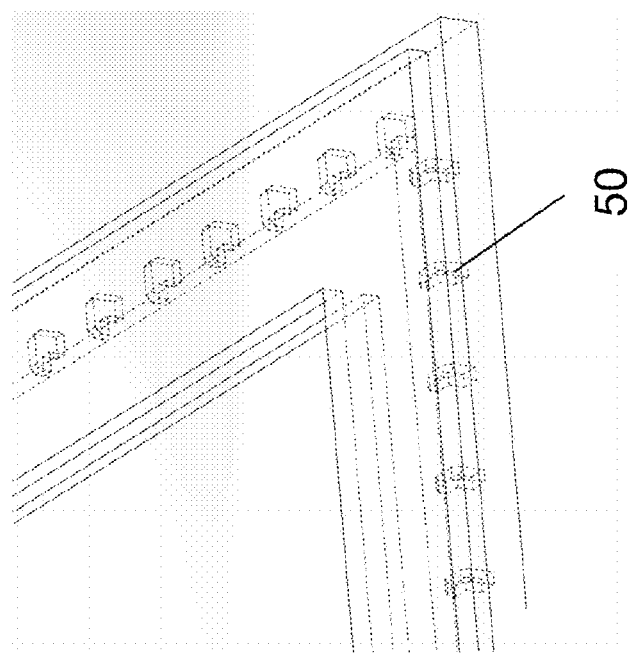
FIG. 3E is a structural schematic diagram showing a hook hole disposed in a deformable portion in an elastic case according to an embodiment.
Figure 3D:
FIG. 3D is a structural schematic diagram showing a hook of a support part in a rigid enhanced rib plate according to an embodiment.

In an embodiment, the support part 20 in the rigid enhanced rib plate may have a hook 40 disposed therein. As shown in FIG. 3D, which is a partially enlarged view of the rigid enhanced rib plate, an end of the support body has a hook 40 disposed thereon. Also, a deformable portion (which may form an elastic portion of the elastic case, such as and edge and the like) may have a hook hole 50 disposed therein. As shown in FIG. 3E, the hook hole 50 is used to match with the hook 40 disposed in the support part 20, in order for the at least two support parts 20 and the deformable part 10 to be fastened.

For the second structure, in an embodiment, the deformable part 10 includes N through-holes, which may constitute the concave/convex structures 30 of the deformable part 10, wherein shapes of the N through-holes can be changed with the acting force applied to the deformable part 10 to actuate the deformation of the concave/convex structures 30, N being an integer greater than 2.

In practical applications, the N through-holes of the deformable part 10 may form a 3D (three dimensional) spatial grid structure, while the 3D spatial grid structure constituted by high elastic polymer material may generate larger bend deformation under an external force, such that the elastic apparatus has a larger stretch rate as a whole, and the deformable part 10 has a pulling rate within a full stretch range without generation of creep.

Figure 4A:
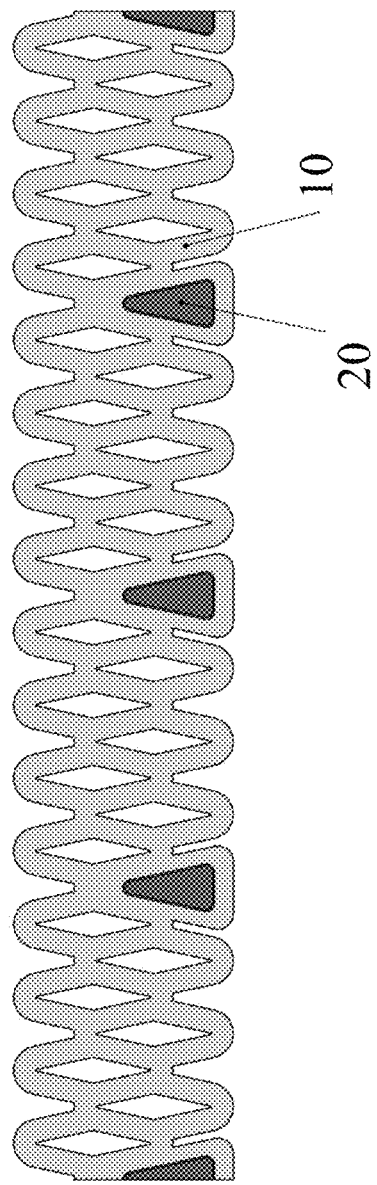
FIG. 4A is a cross-sectional view showing connection of support part and a deformable part according to an embodiment.

In an embodiment, in the structure, the support parts 20 may be embedded (that is, interposed) in through-holes among the N through-holes. As shown in FIG. 4A, a cross-sectional view showing connection of at two support parts 20 and the deformable part 10 is shown.

In an embodiment, in producing the elastic apparatus, the high elastic polymeric material and the high rigid polymeric material may be printed concurrently by using 3D printing technology, so that an elastic apparatus with the structure is obtained. That is, the high elastic polymeric material and the high rigid polymeric material are combined in a smaller range, and a wall thickness of a single layer of the elastic apparatus formed by 3D printing may be less than 0.2 mm. Wherein, the at least two support parts 20 formed of the high rigid polymeric material may provide the rigid material support necessary for the elastic apparatus, and the deformable part 10 formed of the high elastic polymer material may provide the stretch rate necessary for the elastic apparatus.

Thus, in an embodiment, the high elastic polymeric material and the high rigid polymeric material can be bound better by using 3D printing technology to form the elastic apparatus with higher stretch rate. Therefore, the elastic apparatus in the embodiments can effectively prevent a case made of a single material (such when thermoplastic elastic material TPU or TPSiV and the like) in the prior art from resulting in creep of the material of the case due to a larger stretch rate generated during applied force (such as bending the device), so that a creep rate of the elastic case in the deformable device is reduced. Wherein, a creep phenomenon of the material indicates that the material of the case cannot return to an original length due to over stretch when the external force is released, such that a residual stretch portion due to the over stretch occurs for the material, and thereby, the size or even the appearance of the case is changed.

In an embodiment, in the concave/convex structure 30 with the second structure, an amount of variation of a relative distance between a first support part 20 and a second support part 20 (adjacent to each other) of the at least two support parts 20 may be related to an amount of deformation generated by M through-holes of the N through-holes, the M through-holes being through-holes located between the first support part 20 and the second support part 20, M being a positive integer less than or equal to N.

That is, as deformation is necessary for the elastic apparatus, the relative distance between the two adjacent support parts 20 will change, and the amount of deformation of stretch or compression is correlated with the amount of stretch or compression generated from deformation of multiple through-holes located between the two support parts 20. For example, when the relative distance of the adjacent support parts 20 is increased, the multiple through-holes in correspondence may be stretched to generate a corresponding amount of deformation.

In an embodiment, the N through-holes may be of a first shape when the deformable part 10 is not deformed, the N through-holes may be of a second shape when the degree of deformation of the deformable part 10 is less than or equal to a first degree of deformation, and the N through-holes may be of a third shape when the degree of deformation of the deformable part 10 is greater than the first degree of deformation.

Figure 4B:
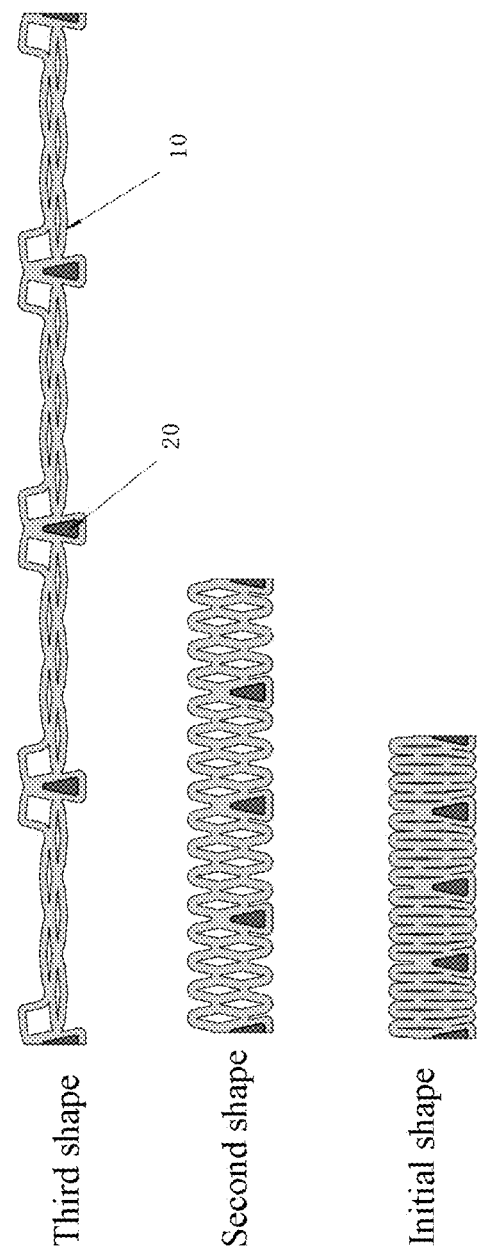
FIG. 4B is a structural schematic diagram showing change of shapes of N through-holes according to an embodiment.
Figure 4C:
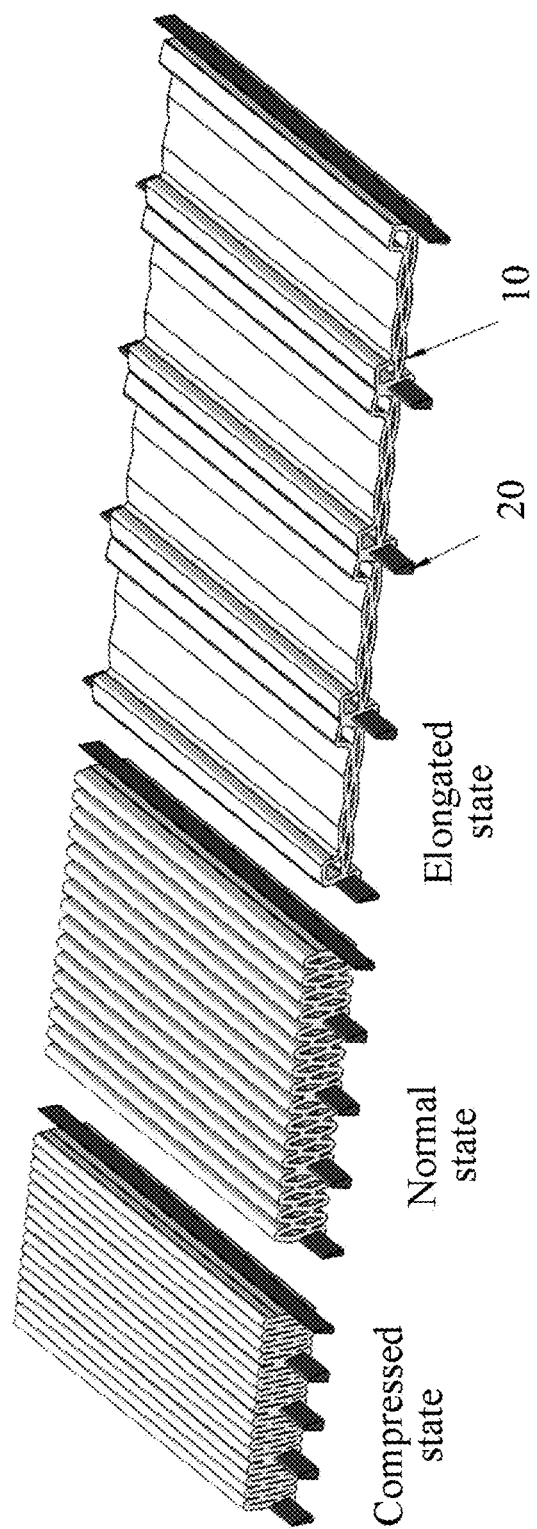
FIG. 4C is a structural schematic diagram showing deformation of a deformable part comprising N through-holes according to an embodiment.

In an embodiment, the first shape is an initial shape, and the N through-holes are in a compressed state at the same time; the second shape is a shape which is formed when the N through-holes are under an external force; the third shape is a shape which is formed when the N through-holes are under an external force and elastic force of the deformable part 10. Referring to FIG. 4B, a schematic diagram showing shapes of the N through-holes when the deformable part 10 is under different applied force is shown. FIG. 4C shows a corresponding state of the deformable part 10 when the N through-holes are in different forms.

In an embodiment, the 3D spatial grid structure of the deformable part 10 can generate a 3D deformation under applied force to provide a stretch rate up to 400% for the deformable part 10, while the stretch rate for the material itself may be guaranteed to be far less than 50%, that is, it is within allowable elasticity without creep.

Moreover, the 3D printing is a lamination processing, so that the 3D spatial grid structure of the elastic apparatus may be more complex in that the deformable part 10 and the support parts 20 may be interposed and matched arbitrarily (interposed in a 3D space), such that not only very high stretch deformation may be implemented, but also departure of two materials is avoided during deformation.

Figures 5C, 5D:
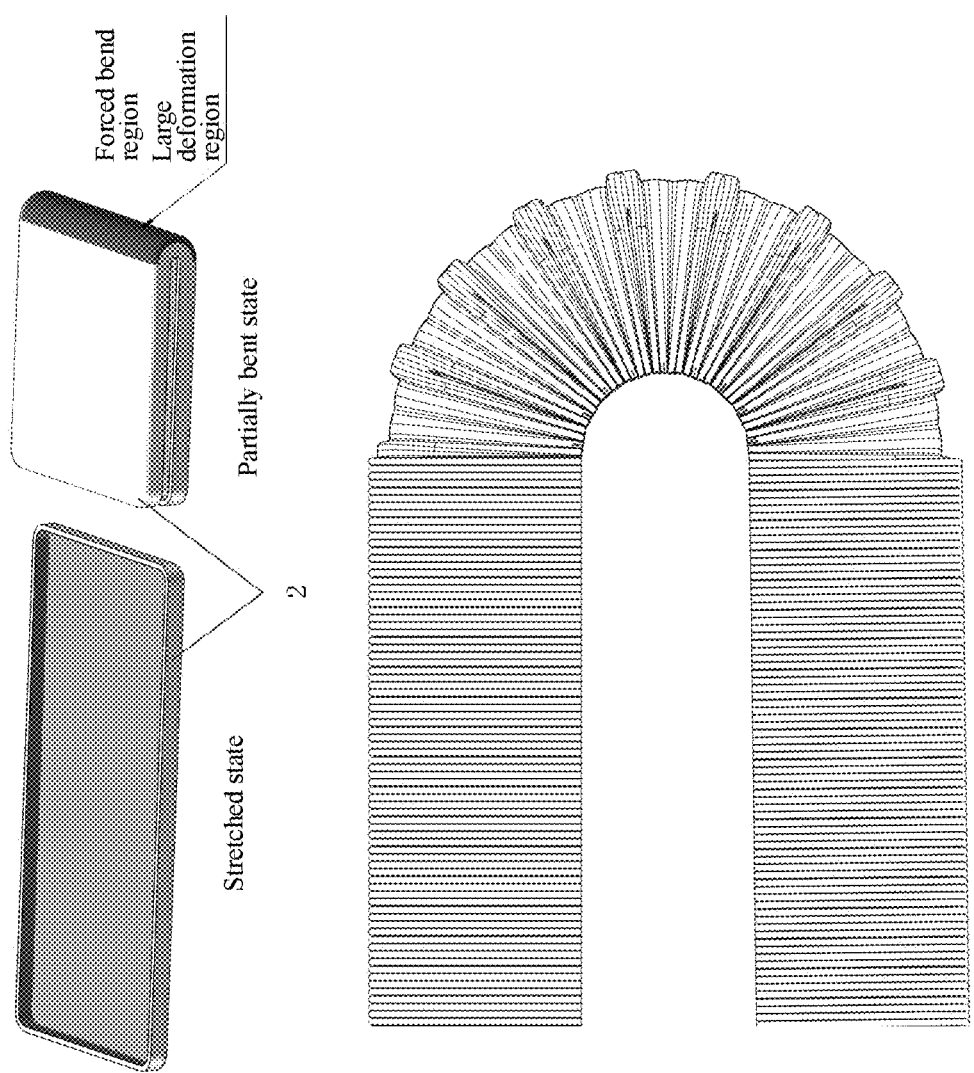
FIG. 5C is a structural schematic diagram showing an elastic case according to an embodiment.
FIG. 5D is a partially enlarged view showing a bent elastic case according to an embodiment.

Referring to FIG. 5A, based on the embodiments, a deformable device is further provided, which includes a flexible display 1 and an elastic case 2 matched with the flexible display, wherein the elastic case 2 includes an elastic apparatus, which provides a corresponding degree of stretch for the elastic case 2 by means of deformation. FIG. 5B is a partially enlarged view showing a corner of the deformable device. FIG. 5C is a schematic diagram showing the elastic case 2, in an embodiment, in a stretched state and a partially bent state. FIG. 5D is a partially enlarged view showing the elastic case 2 in a partially bent state.

In an embodiment, for example, the elastic apparatus is disposed at least in the elastic case 2 and a first portion corresponding to a bent portion of the flexible display device, the elastic apparatus including a deformable part 10, which includes at least two surfaces, which appear as regular concave/convex structures 30, while degrees of concavity/convexity of the concave/convex structures 30 are changeable subject to the force applied to the deformable part 10; wherein a deformation of the concave/convex structures 30 in the deformable part 10 results in extension of the elastic apparatus when the flexible display 1 is bent.

In an embodiment, the elastic apparatus may further include at least two support parts 20, which are embedded in the deformable part 10 for supporting the elastic apparatus; wherein the at least two support parts 20 are embedded in a groove or opening formed by the concave/convex structure 30 on a first surface among the at least two surfaces, the first surface being an inner surface of the elastic apparatus, or the at least two support parts 20 are embedded in at least two through-holes among N through-holes included in the deformable part 10, and shapes of the N through-holes can change subject to the force applied to the deformable part 10.

In an embodiment, the deformable device may further include a flexible rotating shaft located inside the elastic case 2 and disposed in parallel with the flexible display 1, and connected with the two support parts 20, such that when the flexible display device is bent, the at least two support parts 20 are actuated to have a relative location therebetween changed in correspondence, and a bending direction of the flexible display 1 is controlled.

Figure 6A:
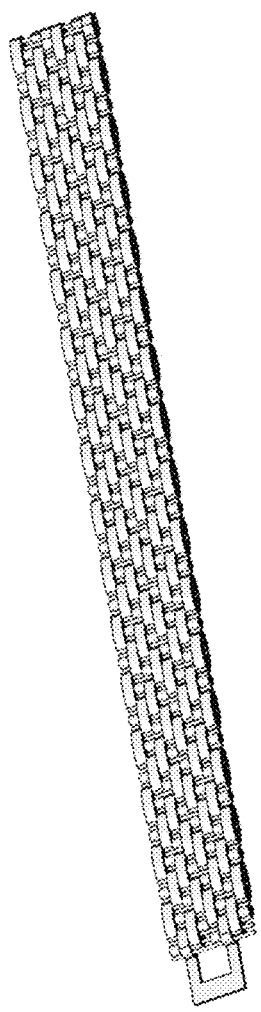
FIG. 6A is a structural schematic diagram showing a flexible rotating shaft according to an embodiment.
Figure 6B:
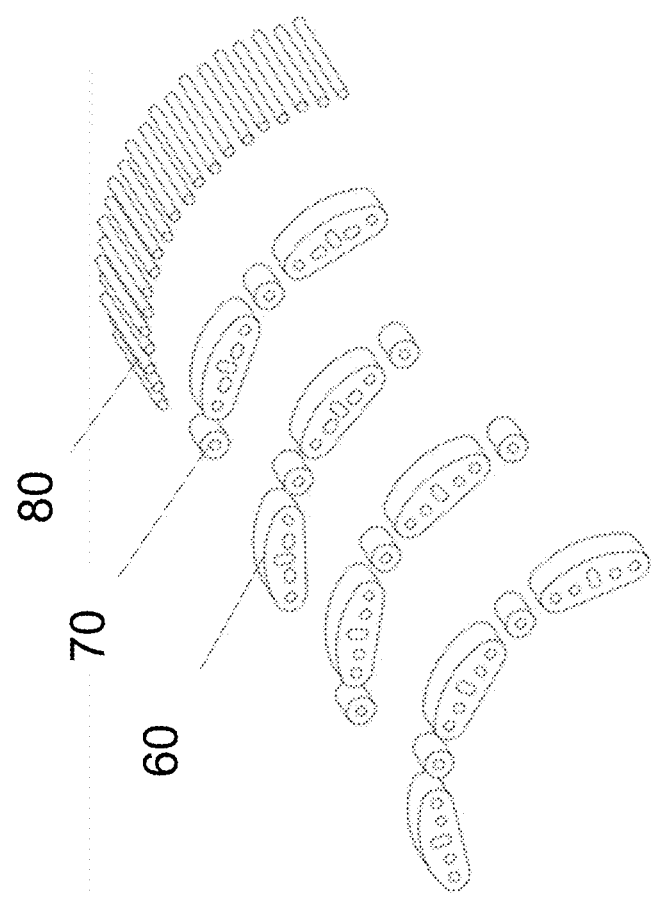
FIG. 6B is a structural schematic diagram showing a flexible rotating shaft according to an embodiment.

Referring to FIG. 6A, a schematic diagram showing the flexible rotating shaft is shown. Specifically, the flexible rotating shaft includes multiple connecting elements and chain links. As shown in FIG. 6B, a connecting element 60, a chain link 70, and a connecting shaft 80 are shown. Both the connecting element 60 and the chain link 70 include holes with the same model therein for interposing a connecting shaft 80 to connect the connecting element 60 and the chain link 70, so that bending of the flexible rotating shaft is implemented. The minimum curling radius of the chain link 70 may be up to several millimeters depending on the overall dimension of a tiny steel part. Generally speaking, when the overall dimension is decreased, the minimum bending radius of the chain link in the shaft is decreased accordingly until a balance point of a processing limit and an overall strength is reached.

Figure 6C:
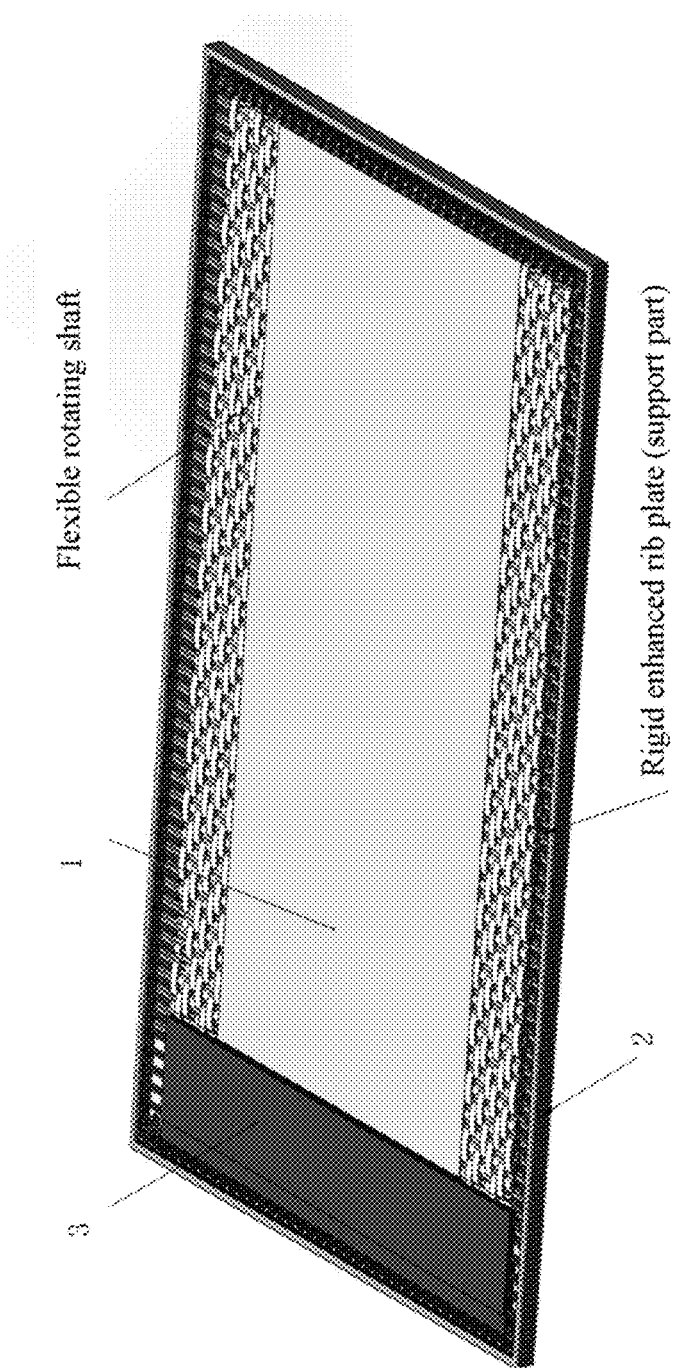
FIG. 6C is a structural schematic diagram showing connection of a flexible rotating shaft and an elastic case according to an embodiment.

As shown in FIG. 6C, a schematic diagram showing connection of the flexible rotating shaft and the elastic case 2 in the deformable device is shown. An electronic component 3 set in connection with the flexible display 1 in the deformable device is shown. The electronic component set is usually a part incapable of deformation.

In an embodiment, when the flexible rotating shaft and the flexible display 1 are disposed in parallel (generally speaking, the flexible rotating shaft is located on an edge of the flexible display 1), the respective dimensions thereof may be set according to actual requirement without specific constraint in the embodiments.

In an embodiment, the flexible rotating shaft may be assembled by multiple alloy steel wires with small diameters and multiple sets of tiny elastic wear resistant steel machineries with special designs, as shown in FIG. 6A, for providing function of one-way flexibility, that is, the flexible rotating shaft may be bent one direction, and the rigid feature occurs in the reverse direction.

In an embodiment, the flexible rotating shaft achieves a maximum expansion of 180 degrees in a straight state (that is, without deformation), and free curl between [0, 180] is available in one-way bending while a certain friction resistance is provided. In an embodiment, a quantity of sets of the flexible rotating shafts in the deformable device may be set according to actual requirement, but there is no specific constraint in the present invention. Generally speaking, the larger the quantity of sets results in better mechanical property, but space for internal electronic components will be occupied.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A deformable housing, comprising:
   a recess for holding a deformable device;
   a deformable portion comprising at least two surfaces having a plurality of concave/convex structures, wherein the at least two surfaces of the deformable portion comprise a plurality of through-holes, wherein the shape of the through-holes changes in response to an applied force; and
   at least two support parts embedded in the deformable portion.

2. The deformable housing of claim 1, wherein the at least two surfaces of the deformable part are of a sinusoidal-like shape.

3. The deformable housing of claim 1, wherein the at least two support parts are embedded in an opening formed by the plurality of concave/convex structures.

4. The deformable housing of claim 1, wherein the at least two support parts comprise coupling mechanisms disposed at each end that mates with opposing coupling mechanisms disposed in the deformable portion.

5. The deformable housing of claim 1, wherein each of the at least two support devices are embedded within a through-hole of the deformable portion.

6. The deformable housing of claim 1, wherein the shape of the plurality of through-holes comprises:
  a first shape when the deformable portion is not deformed;
  a second shape when a degree of deformation of the deformable portion is less than or equal to a first degree of deformation; and
  a third shape when the degree of deformation of the deformable portion is greater than the first degree of deformation.

7. The apparatus of claim 1, wherein a first degree of concavity/convexity is reduced to a second degree of concavity/convexity when the deformable housing is elongated.

8. The apparatus of claim 1, wherein each of the at least two support parts is in a columnar form.

9. The apparatus of claim 1, wherein the deformable part is comprised of an elastic material and each of the at least two support parts is comprised of a rigid material.

10. A system, comprising:
  a deformable device having a flexible display; and
  a deformable housing coupled to the deformable device, wherein the deformable housing comprises:
  a recess for holding the deformable device;
  a deformable portion comprising at least two surfaces having a plurality of concave/convex structures, wherein the at least two surfaces of the deformable portion comprise a plurality of through-holes, wherein the shape of the through-holes changes in response to an applied force; and
  at least two support parts embedded in the deformable portion.

11. The system of claim 10, wherein the at least two surfaces of the deformable part are of a sinusoidal-like shape.

12. The system of claim 10, wherein the at least two support parts are embedded in an opening formed by the plurality of concave/convex structures.

13. The system of claim 10, wherein the at least two support parts comprise coupling mechanisms disposed at each end that mate with opposing coupling mechanisms disposed in the deformable portion.

14. The system of claim 10, wherein each of the at least two support devices are embedded within a through-hole of the deformable portion.

15. The system of claim 10, wherein the shape of the plurality of through-holes comprises:
  a first shape when the deformable portion is not deformed;
  a second shape when a degree of deformation of the deformable portion is less than or equal to a first degree of deformation; and
  a third shape when the degree of deformation of the deformable portion is greater than the first degree of deformation.

16. The system of claim 10, wherein a first degree of concavity/convexity is reduced to a second degree of concavity/convexity when the deformable housing is elongated.

17. The system of claim 10, wherein the deformable portion is comprised of an elastic material and each of the at least two support parts is comprised of a rigid material.

* * * * *